July 31, 1923.
N. W. KRASE ET AL
CONDENSER
Filed March 17, 1921  2 Sheets-Sheet 1
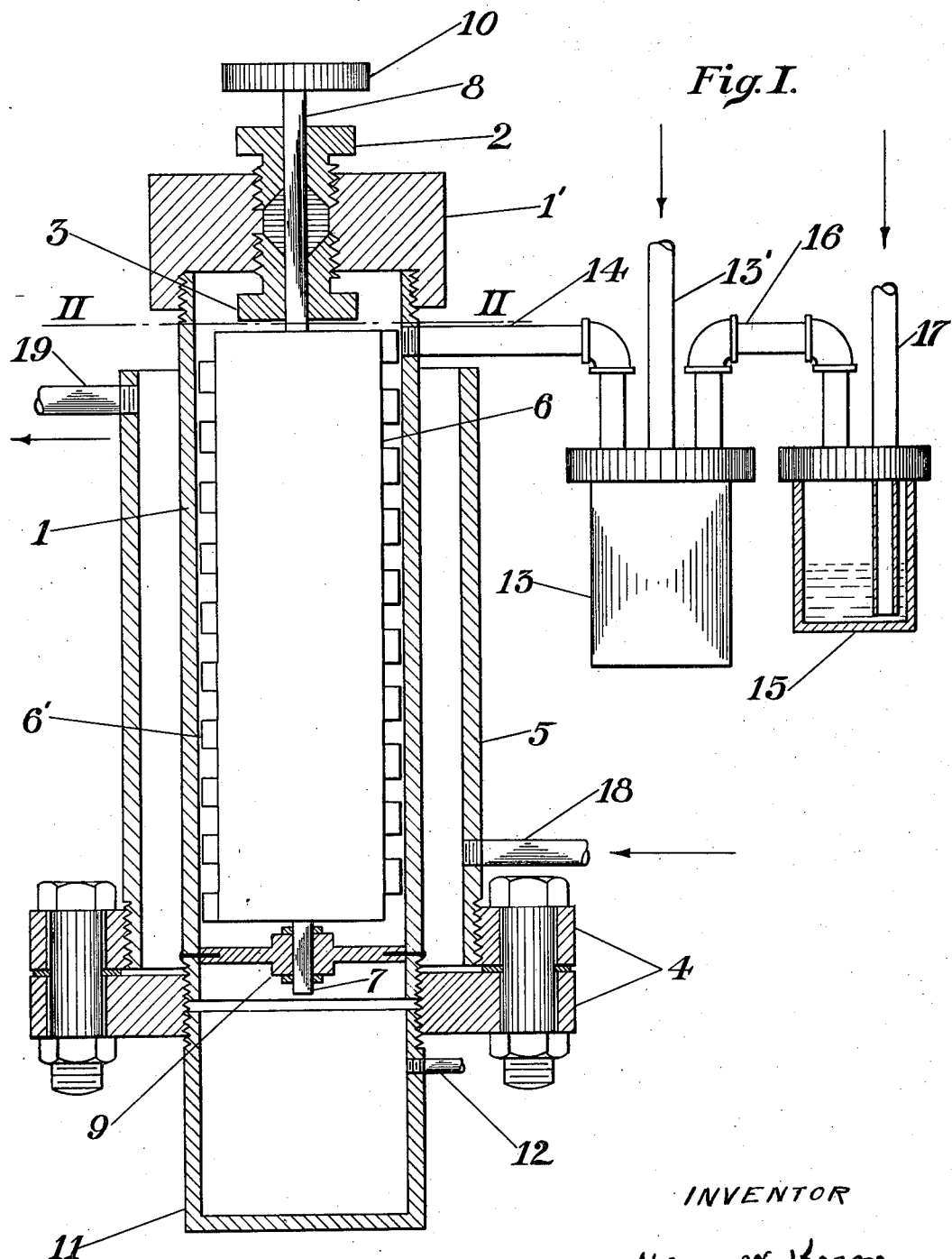
Fig. I.
INVENTOR

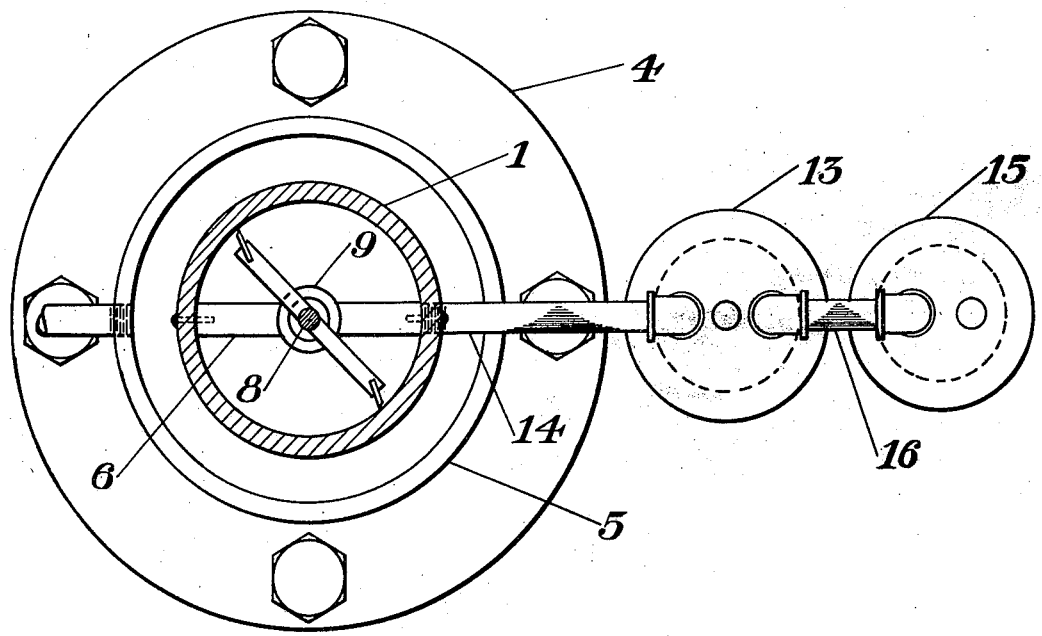
Fig. II.

Patented July 31, 1923.

1,463,216

UNITED STATES PATENT OFFICE.

NORMAN W. KRASE, OF CLARENDON, VIRGINIA, AND VERNIE LESESSNE GADDY, OF DILLON, SOUTH CAROLINA.

CONDENSER.

Application filed March 17, 1921. Serial No. 453,021.

*To all whom it may concern:*

Be it known that we, NORMAN W. KRASE and VERNIE LESESSNE GADDY, citizens of the United States, and residents of, respectively, Clarendon, county of Arlington, and State of Virginia, and Dillon, county of Dillon, and State of South Carolina, have invented an Improvement in a Condenser, of which the following is a specification.
The subject of this invention is a condenser especially adapted for the manufacture of solid compounds of ammonia and carbon dioxide with or without water vapor, or solid condensates of other condensable gases and (or) vapors.

The main object of the invention is the provision of a condenser equipped with means for removing the solid condensate therefrom, as formed.
The invention also contemplates the provision of means for collecting the condensate when removed.

A still further object of the invention is the provision of a simple, cheap and efficient condenser.

With these and other objects in view the invention resides in the novel arrangement and combination of parts and in the details of construction hereinafter described and claimed, it being understood that changes in the precise embodiment of the invention herein disclosed may be made within the scope of what is claimed without departing from the spirit of the invention.
One practical embodiment of the invention is illustrated in the accompanying drawings, wherein:

Fig. 1 is a view in vertical section, parts in elevation, of a condenser constructed in accordance with the invention;

Fig. 2 is a section taken on the lines II—II of Fig. 1, looking downward.

Referring to the drawings by numerals of reference:

In carrying out our invention we prefer to use a vertical, cylindrical, cooling condenser provided with a rotary scraping blade motivated by a shaft passing through a stuffing box, and with a hopper or receiver for the reception of the condensate, as more particularly hereinafter described.

As herein illustrated, we provide a cylinder 1, preferably vertically disposed, closed at its upper end conveniently by a screw cap 1' which is centrally bored and tapped for the reception of members 2 and 3 of a stuffing box.

A shaft 8 passes through the stuffing box, in which it is rotatable, and has connected thereto at its lower end a blade 6 disposed within the cylinder and formed with scraping members 6' along each longitudinal edge, which members are adapted to contact the walls of the cylinder 1 and remove therefrom the condensate formed thereon by the gases coming in contact with the cool walls of the cylinder.

A suitable means, such as the pulley 10, is secured to the upper end of the shaft 8 for the purpose of rotating the shaft and blade.

At the lower end of the blade 6 is secured a stub shaft 7 which is journaled in a cross bar 9 suitably fastened within the lower end of the cylinder.

For the purpose of cooling the cylinder we may use a cylindrical jacket 5 which encircles the cylinder and is open at its upper end and secured to the cylinder at its lower end by an ordinary flange joint or clamp 4.

To permit of proper circulation of the cooling fluid an inlet pipe 18 is threaded into an aperture formed in the jacket adjacent its lower end and another pipe 19 is threaded into an aperture formed in the jacket adjacent its upper end.

A receptacle 11 is positioned below the open lower end of the cylinder 1 to receive the condensate scraped from the walls of the cylinder by the blade 6. This receptacle may conveniently be threaded into the lower flange of the flange joint 4 as shown most clearly in Fig. 1. To permit escape of gases from the condensate in the receptacle, an outlet pipe 12 is provided which communicates with the interior of the receptacle, preferably adjacent the upper end thereof.

A pipe 14 places the interior of the cylinder 1 in communication with a gas mixer 13 in which gases may be mixed at any desired temperature before passing to the condenser. The mixer is provided with an inlet pipe 13' through which gas may be admitted thereto and is in communication with a saturator 15 through a pipe 16. The saturator has a gas inlet pipe 17 terminating near the bottom thereof through which gas may be admitted to bubble through the liquid and pass to the mixer.

As an example of the operation of the device, the operation in carrying out the manufacture of compounds formed from ammonia, carbon dioxide and water will be described.

Carbon dioxide gas is passed through pipe 17 into the saturator 15, which contains water at 35° C. or at any suitable temperature that will cause the desired quantity of water to be taken up by the gas. From the saturator 15 the carbon dioxide gas with water vapor passes through the pipe 16 into the mixer 13 where it is intimately mixed with ammonia which is admitted directly to the mixers through the inlet pipe 13'. The mixer is kept at a temperature of about 80° C. or at such temperature as to prevent condensation.

The mixture of ammonia, carbon dioxide and water vapor then passes through pipe 14 to the condenser where it is condensed on the cool walls of the cylinder 1 from which it is scraped by the rotating blade 6 and falls into the receptacle 11, from which it is recovered.

By suitable manipulation and control of the rate of flow of ammonia and carbon dioxide and suitable regulation of the temperature of the water in the saturator 15, various compounds formed from ammonia, carbon dioxide and water may be produced.

Having described our invention what we claim as new and desire to secure by Letters Patent is:

1. A condenser, embodying a vertically disposed cylinder, means for admitting fluid to the cylinder, a closure for the upper end of the cylinder, a shaft journaled in the closure, a scraper blade secured at its upper end to the shaft and contacting the walls of the cylinder, a cross bar fastened in the lower end of the cylinder, a stub shaft secured to the lower end of the scraper blade and journaled in the cross bar, a cooling jacket surrounding the cylinder, a receptacle below the cylinder, and a clamp secured to the lower end of the cylinder and connecting the cooling jacket and receptacle to the cylinder.

2. A condenser, including a cylinder open at its lower end, means for admitting fluid to the cylinder, a closure for the upper end of the cylinder, a shaft journaled in the closure, a scraper blade secured to the shaft and contacting the walls of the cylinder, a cooling jacket surrounding the cylinder, a receptacle below the cylinder and a clamp secured to the cylinder and connecting the cooling jacket and receptacle to the cylinder.

NORMAN W. KRASE.
VERNIE LESESSNE GADDY.